(12) United States Patent
Kempinski

(10) Patent No.: US 7,130,180 B2
(45) Date of Patent: Oct. 31, 2006

(54) PARTITIONED EXCITER SYSTEM

(75) Inventor: Steve John Kempinski, Saline, SC (US)

(73) Assignee: Champion Aerospace, Inc., Liberty, SC (US)

( * ) Notice: Subject to any disclaimer, the term of this patent is extended or adjusted under 35 U.S.C. 154(b) by 0 days.

(21) Appl. No.: 10/616,105

(22) Filed: Jul. 9, 2003

(65) Prior Publication Data
US 2005/0007722 A1   Jan. 13, 2005

(51) Int. Cl.
*F23Q 3/00* (2006.01)
(52) U.S. Cl. .................. 361/253; 361/256; 361/257
(58) Field of Classification Search .............. 361/253, 361/263, 256, 257
See application file for complete search history.

(56) References Cited

U.S. PATENT DOCUMENTS

| | | | | |
|---|---|---|---|---|
| 2,566,235 A | * | 8/1951 | Mathisen | 169/61 |
| 2,619,513 A | * | 11/1952 | Wolfenbarger | 123/595 |
| 2,716,720 A | * | 8/1955 | McNulty | 315/180 |
| 2,896,123 A | * | 7/1959 | McNulty | 315/177 |
| 3,395,684 A | * | 8/1968 | Minks | 123/647 |
| 4,027,198 A | * | 5/1977 | Linkroum | 315/209 CD |
| 4,274,695 A | * | 6/1981 | Fukumori et al. | 439/424 |
| 4,583,811 A | * | 4/1986 | McMills | 439/584 |
| 4,587,436 A | | 5/1986 | Cronin | |
| 4,589,398 A | | 5/1986 | Pate et al. | |
| 4,684,840 A | | 8/1987 | Bertram et al. | |
| 4,978,309 A | * | 12/1990 | Straub | 439/126 |
| 5,041,707 A | * | 8/1991 | Anderson | 418/55.3 |
| 5,510,952 A | | 4/1996 | Bonavia et al. | |
| 5,587,630 A | | 12/1996 | Dooley | |
| 5,603,306 A | * | 2/1997 | Tai | 123/633 |
| 5,654,868 A | | 8/1997 | Buer | |
| 5,821,632 A | | 10/1998 | Normann et al. | |
| 6,043,567 A | | 3/2000 | Uhler et al. | |
| 6,195,247 B1 | | 2/2001 | Cote et al. | |
| 6,211,596 B1 | | 4/2001 | Freise | |
| 6,358,072 B1 | * | 3/2002 | Johnson | 439/126 |
| 2002/0101188 A1 | * | 8/2002 | Frus et al. | 315/224 |

OTHER PUBLICATIONS

Srtandard Handbook for Electrical Engineers, 1968, McGraw Hill, Inc., pp. 13-2, 13-3.*

* cited by examiner

*Primary Examiner*—Brian Sircus
*Assistant Examiner*—Z Kitov
(74) *Attorney, Agent, or Firm*—Reising, Ethington, Barnes, Kisselle, P.C.

(57) ABSTRACT

A partitioned exciter system for use with an igniter in an aircraft engine. The exciter has low-energy charging circuit and a high-energy discharge circuit that are remotely located from each other and that are connected by a low-energy coaxial cable. The charging circuit can be located within the aircraft fuselage and the discharge circuit mounted at the engine. The discharge circuit contains passive components that do not need special environmental protection, and the remotely located charging circuit can utilize existing electrical circuitry protection measures already in place in the fuselage to protect against lightning and other potentially-damaging environmental factors. Also disclosed is a housing arrangement for the discharge circuit that allows it to be directly attached to the igniter.

36 Claims, 2 Drawing Sheets

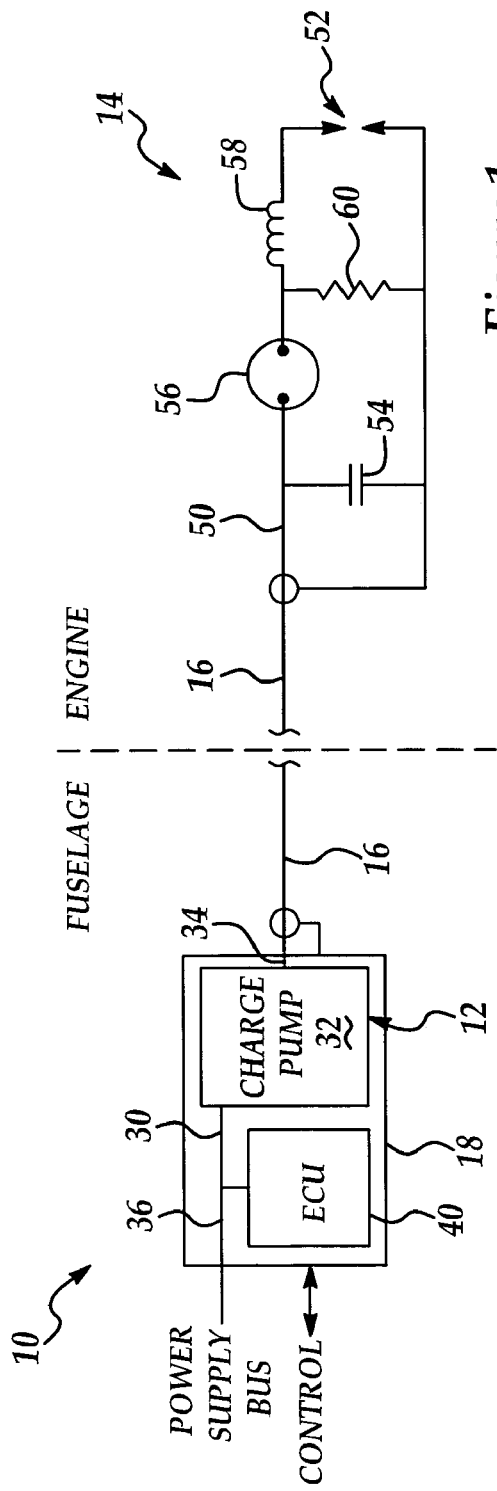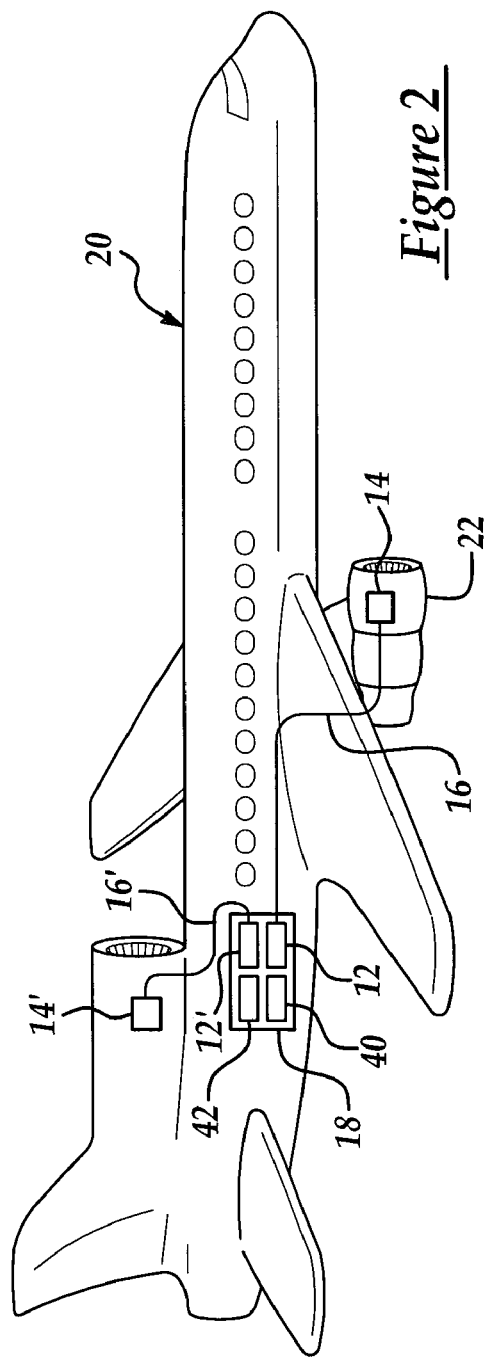

PARTITIONED EXCITER SYSTEM

TECHNICAL FIELD

The present invention relates generally to spark ignition circuits and, more particularly, to exciter circuits used for jet aircraft engines.

BACKGROUND OF THE INVENTION

Exciter circuits are used on jet aircraft and in other applications to supply high voltage spark energy to an igniter which creates a spark in the jet engine's combustion chamber to initiate and/or maintain combustion within the engine. Traditional jet aircraft exciter circuits are well known in the art and are typically designed to utilize a low voltage supply to generate the high voltage output needed to create the spark. Numerous direct flyback, capacitive discharge, and hybrid ignition circuits have been proposed over the years. These systems typically include an exciter circuit that is connected to the igniter via a high-energy cable or ignition wire capable of carrying the high voltage and high currents necessary to produce the spark. The exciter circuit is often located close to the igniter so as to avoid the need for long runs of these high-energy cables.

The exciter circuits themselves can be implemented using various circuit designs, as noted above. For example, the exciter may include a charging circuit together with an output discharge circuit that stores energy from the charging circuit for use in creating the spark. The charging circuit commonly includes an inductive device, such as a fly-back transformer, for providing a high voltage pulse to an energy storage device, such as a capacitor, located in the discharge circuit. The discharge circuit can further include a switching device, such as a spark gap or SCR, located in series between the energy storage device and an igniter plug such that they are isolated from each other by the switching device. When the switching device is closed, it acts as a short and the stored energy is discharged across the igniter plug, thereby creating the spark.

When used in aircraft applications, the exciter circuits must meet certain performance requirements regarding electromagnetic interference (EMI) and lightning protection. In order to meet these requirements, the exciter circuit is typically housed within a protective enclosure that provides lighting protection and EMI isolation. Since the exciter circuits are normally located at the aircraft engine, such as out on the aircraft wing, these protective devices or features are separate and independent of similar devices already being used to shield and protect other electrical circuitry located at other places within the aircraft. Also, because the high-energy cables involved may carry anywhere from 600–2000 amps of electrical current, the shielding requirements addressing EMI radiation from the cables may be quite extensive, thereby increasing the cost of the system.

SUMMARY OF THE INVENTION

In accordance with the present invention there is provided an exciter system which is partitioned into a low-energy charging circuit and a high-energy discharge circuit that are connected to each other via a low-energy electrical cable. The charging circuit utilizes operating power received on its input to supply a high voltage, low current charging signal on its output. The high-energy discharge circuit generally utilizes an energy storage device to store energy received from the charging signal and a switching device to supply the stored energy to an igniter. By partitioning the exciter in this manner, the discharge circuit can be located near the igniter while the charging circuit can be remotely located in a more protected environment. Also, the use of a low current charging via the cable permits the use of any of a number of different types of shielded or unshielded cables, including, for example, a relatively low-cost coaxial cable, and allows the charging and discharge circuits to be located far apart, if desired. This permits the use of a variety of different physical design layouts, such as, for example, having the charging circuit located in an aircraft fuselage with the discharge circuit located at the aircraft engine regardless of whether it is mounted on the aircraft wing, tail, or other location.

In accordance with another aspect of the invention, there is provided an exciter system having a charging circuit, a discharge circuit, a cable interconnecting the two circuits, and a housing for at least a part of the discharge circuit. The housing has first and second openings with the cable providing a charging signal to the discharge circuit via the first opening and a connector being disposed in the second opening. The igniter is directly attached to the connector. This permits the exciter circuit to be partitioned with the discharge circuit located at the igniter and the charging circuit located remotely.

In accordance with another aspect of the present invention, there is provided a discharge circuit apparatus that can be used as a part of the partitioned exciter system summarized above. The discharge circuit apparatus includes a housing comprising a metal can having a bottom wall, at least one side wall integral with the bottom wall, and an open end. The housing also includes a lid covering the open end of the can. A discharge circuit is located within the housing and includes an input for receiving operating power via a first opening in the housing and an output for providing an ignition pulse via a second opening in the housing. A connector is disposed in the second opening and is connected to the output of the discharge circuit.

In accordance with yet another aspect of the invention, there is provided a method of assembling a housed discharge circuit. The method includes the steps of: providing a metal can such as the one noted above which includes a bottom wall, at least one side wall that is integral with the bottom wall, and an open end; providing a lid that fits over the open end; attaching a connector into an opening in the lid; mounting a discharge circuit on an inside surface of the lid; electrically connecting the discharge circuit to the connector; and mounting the lid over the open end of the can with the discharge circuit being enclosed in the can between the bottom wall and the lid. In this way, the discharge circuit is assembled to the lid initially and can then be placed into the can when the lid is attached over the open end of the can. Preferably, the discharge circuit is then potted within the can.

BRIEF DESCRIPTION OF THE DRAWINGS

A preferred exemplary embodiment of the invention will hereinafter be described in conjunction with the appended drawings, wherein like designations denote like elements, and wherein:

FIG. 1 is a general circuit diagram of an embodiment of the partitioned exciter system of the present invention;

FIG. 2 is a diagrammatic view of a jet aircraft incorporating the exciter system of FIG. 1;

DETAILED DESCRIPTION OF THE PREFERRED EMBODIMENTS

Figure 3:
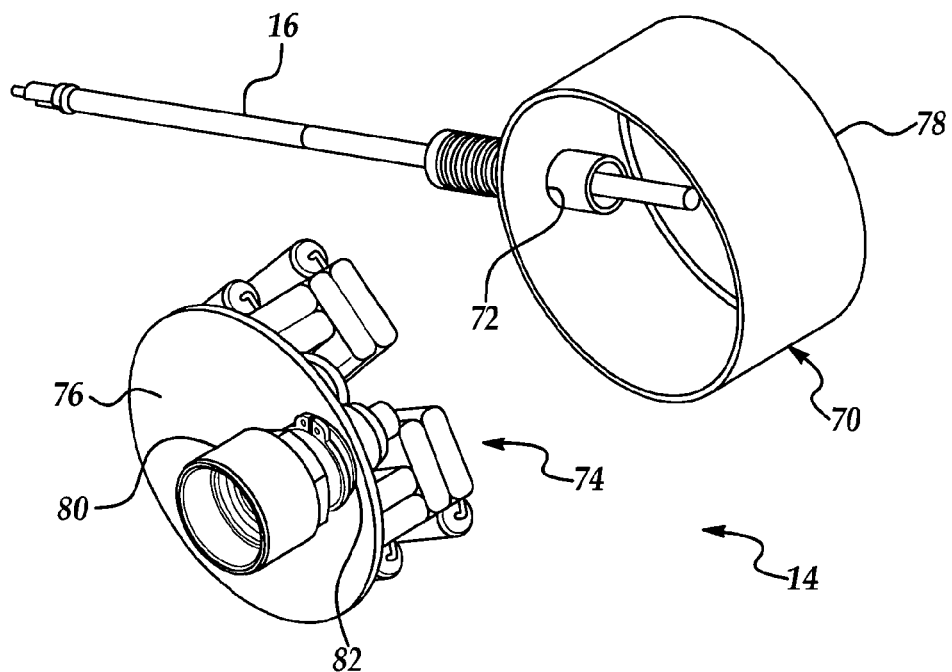
FIG. 3 is a partially-assembled view of the housed discharge circuit shown in FIG. 1.

With reference to FIGS. 1 and 2, there is shown a partitioned exciter system 10 constructed in accordance with the present invention as it might be utilized on a jet aircraft 20 to initiate and maintain combustion within one of the aircraft engines 22. The exciter 10 includes a low-energy charging circuit 12 connected to and remotely located from a high-energy discharge circuit 14. In general, charging circuit 12 uses operating power from an aircraft supply bus or other suitable power source to create a high voltage, low current charging signal which is provided to discharge circuit 14 via a low-current electrical cable 16. The discharge circuit receives this signal and stores its associated energy through the use of an energy storage device, such as a capacitor. The energy accumulates until a switching device connects the energy storage device to an igniter, at which point the stored energy flows through the igniter thereby creating a spark.

By partitioning the exciter 10 into the low-energy charging circuit 12 and high-energy discharge circuit 14, and connecting the two circuits via a low-current cable 16, the two circuits can be remotely spaced over relatively long distances on the aircraft 20 without using expensive, high-current capacity cabling interconnecting them. As shown in FIG. 2, this enables the discharge circuit to be located at the engine 22, while the charging circuit with its active components can be located in the fuselage 24 along with other circuitry in a shielded housing 18 protected against lightning strikes and other external conditions that might impact its operation. Since the more sensitive components of the charging circuit can be located in an existing protective enclosure 18 already provided on the aircraft for other electronics 40 and 42, this circuit topology can decrease the overall cost of the ignition exciter system by eliminating the need for separate shielding of the exciter at the engine 22 while also reducing the amount, and thus the weight, of the ignition circuit electronics located out on the aircraft wing 26. As shown, if desired, the charging circuit 12 can be housed together with one or more other charging circuits 12' that are used in connection with another discharge circuit 14' connected via a cable 16'. This second exciter can be used in conjunction with the same engine or, as shown, another engine on the aircraft. Also, some or all of the other electronics 40, 42 can be part of the overall engine control. For example, ECU 40 can be a part of a FADEC system.

The low-energy charging circuit 12 provides the discharge circuit with a high voltage, low current DC signal and generally includes an input 30, a charge pump 32, and a rectified output 34. The input is coupled to a power source, such as a standard aircraft power supply bus 36. The charge pump, which may include a conventional fly-back transformer or other suitable high voltage, low current power supply, receives operating power at its input 30. The charge pump 12 utilizes the operating power to generate a high voltage, low current DC electrical signal, typically having a voltage in the range of 2000–3000 V and an amperage less than 1 amp and, more preferably, less than 100 mA. Various circuit designs that provide an output having these electrical characteristics are known to those skilled in the art. For example, as is well known a fly-back transformer circuit operates using an electrical current flow through a primary winding of the transformer to create an magnetic field that is periodically halted abruptly such that the magnetic field rapidly collapses, thereby inducing a high voltage pulse in a secondary winding of the transformer. This secondary output can be connected to output 34 via one or more rectifying diodes (not shown). As will be appreciated by those skilled in the art, the low energy charging circuit 12 may contain any number of additional electrical components, such as filters, current limiting devices, and voltage limiting devices, and can assume one of numerous specific circuit designs.

The low-current electrical cable 16 is preferably a coaxial cable capable of carrying the voltages and current loads identified above. However, cable 16 could alternatively be of any type of electrical conductor suitable for transmitting the high voltage charging current supplied by the charge pump 32. Depending upon the particular arrangement of the aircraft 20, specifically the location of the engines 22, the electrical cable 16 could extend through any number of aircraft sections and assemblies. For instance, if the charging circuit 12 is located within the fuselage and the engine is mounted on a wing, cable 16 could extend within an interior passage of the wings from the fuselage to the remote engine location, as shown in FIG. 2. In this regard, it is worth noting that, as used herein in relation to the charging and discharge circuits, the terms "remote" and "remotely" do not refer to any necessary minimum distance nor do they require that the two circuits be located in different parts of the aircraft, but rather means that the charging circuit is located sufficiently far from the discharge circuit that it is not subject to all of the same temperature, electromagnetic, and/or other environmental conditions as the discharge circuit. Thus, the charging circuit need not be located in a different section of the aircraft than the discharge circuit, and can be considered to be located remotely from the discharge circuit even though it may only be within several feet of the discharge circuit.

Cable 16 preferably includes some electromagnetic shielding features to combat the effects of EMI. In the case of a coaxial cable, it includes a central conductor as well as a braided outer conductor which is grounded at both ends as indicated in FIG. 1 to provide the desired shielding. However, the degree of shielding required for cable 16 is reduced from that required for many conventional exciter high voltage cables because the cable 16 only transmits a low-current signal. As mentioned above, conventional systems that employ a cable to conduct discharge pulses to the igniter may need to handle currents in the range of 600–2000 amps, whereas the cable 16 conducts currents that are three to four orders of magnitude less than this.

The high-energy discharge circuit 14 receives the charging signal via cable 16 and stores the energy such that once the stored energy exceeds a certain threshold, it is discharged across an igniter which initiates the combustion process. The high-energy discharge circuit seen in FIG. 1 generally includes an input 50, an igniter 52, and a number of passive electrical components that are typically more robust to widely varying environmental conditions than are some of the active components which may be utilized in the charging circuit 12. "Passive" components include such things as resistors, capacitors, inductors, ferrites, diodes, transformers, and connectors. "Active" components on the other hand are devices that can amplify or switch a signal, such as transistors and multi-transistor circuits (integrated circuits, operational amplifiers, etc.), and include any other device that has a dedicated power and ground connection.

The passive devices utilized in discharge circuit 14 primarily include an energy storage device 54, a switching device 56, a pulse-stretching inductor 58, and a resistor 60.

Input 50 is connected to both an end of electrical cable 16 and a terminal of the energy storage device. In a preferred embodiment, the energy storage device is a 0.27 μF tank capacitor connected between input 50 and ground, although other capacitors as well as other energy storage devices could be used. The individual characteristics of the energy storage device, such as capacitance, inductance, etc., can vary depending upon the spark rate and other performance requirements needed or desired. Switching device 56 can be, for example, a spark gap as shown which is connected in series with the igniter 52 between the storage capacitor 54 and ground. Again, the individual characteristics of the switching device, such as the voltage required to arc across the gap, can be selected as necessary or desirable for any particular application. Inductor 58 is connected in series between spark gap 56 and igniter 52. Inductor 58 is a pulse-stretching inductor which stretches and smoothes the ignition pulse provided to the igniter. Lastly, resistor 60 is a high-valued resistor that provides a ground reference for the output end of the spark gap 56 which would otherwise be entirely isolated from ground. As will be appreciated by those skilled in the art, the high-energy discharge circuit 14 is an exemplary embodiment only and may contain any number of additional electrical components, such as filters, current limiting devices, and voltage limiting devices, and can assume any of a number of different circuit designs.

In operation, low-energy charging circuit 12 provides high-energy discharge circuit 14 with a slow charging high voltage, low current DC charging signal via electrical cable 16. The charging current need only be high enough to enable the capacitor 54 to fully charge fast enough for the exciter circuit to meet the spark rate requirements needed for a particular application. The charging circuit receives operating power and utilizes a charge pump, or the like, for creating the charging signal, which is transmitted via the low-energy electrical cable to an input of the discharge circuit. The charging signal provides for a slow capacitive charge and, due to the low amperage involved, minimizes energy losses and EMI. The energy received from the charging signal slowly accumulates on the capacitor until it is discharged by spark gap 56. In the embodiment seen in FIG. 1 and described above, this discharge occurs when the energy stored on the capacitor exceeds a spark gap threshold, typically in the range of 3000 v. The discharged energy passes through the serially connected inductor 58 in the form of an high-energy ignition pulse, such that the inductor elongates and smoothes the pulse for greater combustion performance. The elongated ignition pulse is then discharged across igniter 52, which has a lower spark gap voltage threshold than that of the spark gap 56, thereby creating a spark across the electrodes of the igniter.

Figure 4:
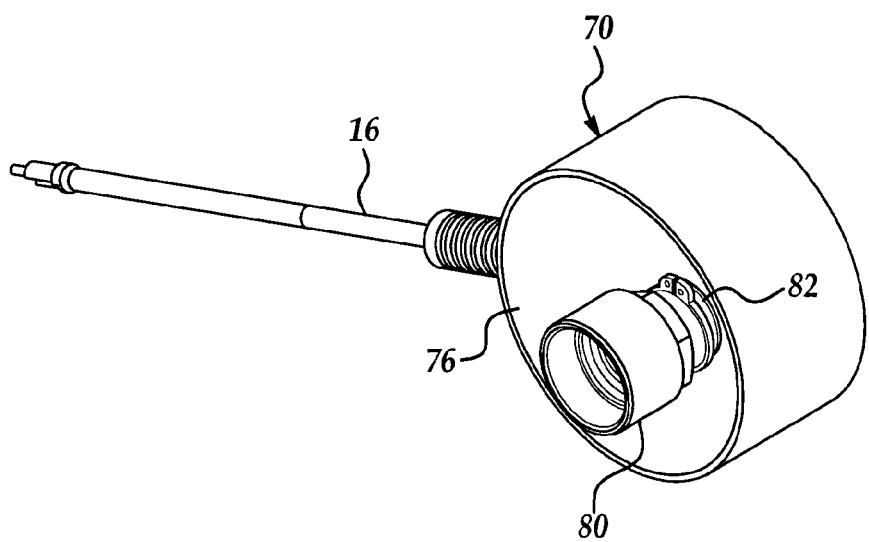
FIG. 4 is a perspective view of the completed discharge circuit and housing of FIG. 3.

With reference now to FIGS. 3–4, there is shown a housing arrangement for the high-energy discharge circuit 14 which utilizes a generally cylindrical housing 70. FIG. 3 shows the housing before it is completely assembled, such that the components of the discharge circuit are revealed. FIG. 4, on the other hand, shows an assembled housing ready for connection to the igniter at the aircraft engine. All of the components of discharge circuit 14, except the igniter 52, are contained within housing 70, although it will be noted that the igniter can be considered the load on which the discharge circuit acts, and need not be considered to be a part of the discharge circuit. As shown, housing 70 comprises a metal can 78 having a bottom wall, a circumferential side wall, and an open end through which the components 74 of discharge circuit 14 are inserted. Housing 70 also includes a metal lid 76 that fits over the open end of the metal can 78 to thereby enclose the components 74 inside the can between its bottom wall and the lid 76.

Electrical cable 16 enters the housing 70 via an opening 72 in the circumferential surface of the housing 70. As previously discussed, cable 16 is connected to the input of discharge circuit 14 such that the cable provides it with a high voltage, low current charging signal. The cable can be routed into the housing 70 via opening 72 and provided with stress relief at the opening. Alternatively, the cable end can be provided with a connector that mates with a complementary connector (both not shown) disposed in the opening 72. The output of discharge circuit 14 provides an ignition pulse to the igniter via a socket 80 that is disposed in an opening 82 in the metal lid 76 such that housing 70 can be directly attached over the terminal end of the igniter 52 which would have previously been installed on the engine. Suitable socket configurations will be known to those skilled in the art.

To provide shielding, the housing 70 (including both the metal can and lid) is electrically connected to the common ground used by the cable 16 and igniter 52. The specific configurations of housing 70 and passive electrical components 74 may differ from that specifically shown in the figures. For instance, the housing could be designed to receive electrical cable 16 through an opening in either the lid 76 or the bottom wall of metal can 78 instead of receiving the cable through the opening 72 in the circumferential surface. Also, housing 70 could be designed such that its general shape is cubical, conical, or any other suitable shape. Furthermore, igniter socket 80 could protrude from either the circumferential surface or the bottom wall of metal can 78. However, as will now be described, socket 80 is advantageously attached to the lid 76 to permit assembly of the discharge circuit onto the lid for subsequent installation into the metal can.

In particular, assembly of the housed discharge circuit is as follows. First the metal can and lid are fabricated, along with their respective openings 72 and 82. Then, the socket 80 is attached in the opening 82. The discharge circuit is then mounted on the inside surface of the lid and connected to the socket. This can include simply making the suitable circuit connection(s) to the connector via one or more electrical conductors and relying on that connection to hold the components in place, or can involve physically securing the components 74 to the lid independently of their circuit connections. The coaxial cable 16 is then routed through the opening 72, fitted with stress relief at that opening, and connected to the discharge circuit with the cable's central conductor being connected to the input 50 and the outer conductor being connected to ground. Once all of the circuit connections have been made, the components are potted in place using a dielectric potting material that surrounds, protects and insulates them. The lid and its components are then attached over the open end of the metal can such that the components are located within the housing between the lid and bottom wall of the can. This attachment can be accomplished by magnetically welding the lid and can together such that a hermetic seal is created. Of course, numerous other attachment techniques known to those skilled in the art could also be used. The potting material can be a conformal coating or a rigid, curable potting material that fills some or all of the interior space of the metal can. In this regard, the potting (or at least the curing of the potting) can occur before or after final installation of the lid onto the can. In either approach, the potting operates to environmentally seal the components inside the housing.

Alternatively, the housed discharge circuit could be assembled such that the circuit components are first inserted and electrically connected within the can, after which the dielectric potting material and lid are added and attached, respectively, as explained above. In some instances, it has been found viable to omit the lid altogether. Assembly according to this method involves the insertion and electrical connection of the circuit components within the can, as previously stated, followed by the addition of potting material right up to the top of the open end of the can. Once cured, the top surface of the potting material, which can, but need not, be flush with the opening in the can, acts as a lid of sorts. Of course, other assembly steps could be added or omitted, if such changes would be apparent to one of ordinary skill in the art.

As will be appreciated, by providing a partitioned low-energy charging circuit and high-energy discharge circuit, the exciter circuit can be used in an aircraft application wherein the discharge circuit can be located out on the aircraft wing at the aircraft engine with the charging circuit located remotely, even in the fuselage, where it can utilize existing lightning and EMI shielding features. Additionally, the partitioned discharge circuit preferably comprises electrical components only of a passive nature, thus lightning protection and other shielding features are less necessary, as the passive components are less susceptible than active components. Furthermore, by transmitting a low-energy DC charging signal from the charging circuit to the discharge circuit, the exciter system reduces energy losses and EMI that may otherwise be associated with a high-energy electrical signal transmission. Also, the simple, compact, and durable design of the generally cylindrical housing allows the components of the discharge circuit to easily be protected and mounted near the aircraft engine, and the igniter socket permits the discharge circuit to be directly attached to the igniter without the need for any high-energy ignition cables interconnecting the discharge circuit and igniter. The above noted features and advantages are just a few of the qualities of the illustrated partitioned exciter system, wherein the disclosed exciter system is of relatively simple design, economical manufacture and assembly and can have a long and useful life in service.

It will thus be apparent that there has been provided in accordance with the present invention a partitioned exciter system which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

The invention claimed is:

1. A partitioned exciter system for use with an aircraft engine, comprising:
   a low-energy charging circuit having an input and an output, said charging circuit being operable to utilize operating power received on said input to supply a high voltage, low current charging signal on said output;
   a high-energy discharge circuit including an input, an igniter, and a number of electrical components, said discharge circuit input being connected to said charging circuit output to receive said charging signal, wherein said electrical components include an energy storage device for storing electrical energy received from said charging signal in an amount sufficient to create a spark across said igniter, said electrical components further including a switching device for supplying said stored energy to said igniter; and
   a low-energy electrical cable connecting said charging circuit with said discharge circuit input, wherein said charging and discharge circuits are remotely located from each other.

2. The exciter system of claim 1, wherein said charging and discharge circuits are remotely located from each other on an aircraft having a fuselage, wings, and at least one engine, with said discharge circuit being located at the engine.

3. The exciter system of claim 2, wherein said low-energy charging circuit is located within the aircraft fuselage and said low-energy cable extends from the aircraft fuselage into one of the aircraft wings.

4. The exciter system of claim 1, further comprising one or more protective devices shielding said low-energy charging circuit together with other electrical circuitry.

5. The exciter system of claim 1, wherein said low-energy charging circuit includes a fly-back transformer.

6. The exciter system of claim 1, wherein said charging circuit supplies DC voltage to said discharge circuit via said cable at a current of one amp or less.

7. The ignition exciter system of claim 6, wherein said current is less than or equal to 100 milliamps.

8. The exciter system of claim 1, wherein said energy storage device is a capacitor.

9. The exciter system of claim 1, wherein said switching device is a spark gap.

10. The exciter system of claim 1, wherein said high-energy discharge circuit further includes a pulse-stretching inductor.

11. The exciter system of claim 1, wherein said high-energy discharge circuit further includes a resistor that provides a ground reference for at least a portion of said discharge circuit.

12. The exciter system of claim 1, wherein said low-energy electrical cable is a coaxial cable.

13. The exciter system of claim 1, wherein all of said electrical components within said discharge circuit are passive components.

14. The exciter system of claim 1, further comprising a housing connected to said low-energy electrical cable and having an output connector connected to said igniter, wherein said electrical components of said discharge circuit are located within said housing.

15. The exciter system of claim 14, wherein said electrical components are sealed within said housing.

16. The exciter system of claim 15, wherein said electrical components are potted within said housing.

17. The exciter system of claim 14, wherein said output connector is directly attached to said igniter.

18. An exciter system for use with an aircraft engine, said system comprising:
   a charging circuit having an output and being operable to supply a charging signal on said output;
   a housing having first and second openings with a connector disposed in said second opening;
   a discharge circuit being at least partially contained within said housing and including:
      an input for receiving said charging signal,
      an energy storage device contained within said housing, said energy storage device being connected to said input and said connector to thereby store electrical energy received from said charging signal and to thereby provide the stored energy to said connector, a switching device connected in circuit to initiate discharge of the stored energy from said energy storage device to said connector, and an igniter connected to said connector, wherein said energy storage device and said switching device are sealed within said housing, and wherein said energy storage device stores sufficient energy from said charging signal to create a spark at said igniter; and an electrical cable connected to said charging circuit output and to said discharge circuit input via said first opening of said housing, wherein said charging and discharge circuits are remotely located from each other.

19. The exciter system of claim 18, wherein said charging circuit is operable to provide said charging signal as a high voltage, low current charging signal and wherein said electrical cable is a high voltage, low energy cable.

20. The exciter system of claim 19, wherein said charging circuit supplies DC voltage to said discharge circuit via said cable at a current of 100 milliamps or less.

21. The exciter system of claim 18, wherein said charging and discharge circuits are remotely located from each other on an aircraft having a fuselage, wings, and at least one engine, with said charging circuit being located within the aircraft fuselage, said discharge circuit being located at the engine, and said cable extending from the aircraft fuselage into one of the aircraft wings.

22. The exciter system of claim 18, further comprising one or more protective devices shielding said charging circuit together with other electrical circuitry.

23. The exciter system of claim 18, wherein said igniter is directly attached to said connector, and wherein said connector comprises a socket connected over a terminal end of said igniter.

24. The exciter system of claim 18, wherein said housing is generally cylindrical.

25. The exciter system of claim 24, wherein said first opening is located on a circumferential surface of said generally cylindrical housing and said second opening is located on an end surface of said housing.

26. The exciter system of claim 18, wherein said housing contains a number of electrical components that are a part of said discharge circuit and wherein all of said electrical components are passive devices.

27. An exciter system for use with an aircraft engine, said system comprising:

a first housing;

a charging circuit located within said first housing and having one or more active components and an output for supplying a charging signal from said housing;

a second housing;

a discharge circuit being at least partially contained within said second housing and including:

an input for receiving said charging signal, an energy storage device contained within said second housing for storing electrical energy received from said charging signal, a switching device for supplying said stored energy, and an igniter connected to receive said stored energy from said energy storage device, said stored energy causing said igniter to spark, wherein said energy storage device stores sufficient energy from said energy charging signal to create a spark at said igniter;

an electrical cable connected between said first and second housings to transmit said charging signal from said charging circuit to said discharge circuit;

wherein said first housing provides shielding of said one or more active components and said second housing is located near said igniter, whereby said exciter system is partitioned between said first and second housings.

28. The exciter system of claim 27, wherein said charging circuit is operable to provide said charging signal as a high voltage, low current charging signal and wherein said electrical cable is a high voltage, low energy cable.

29. The exciter system of claim 28, wherein said charging circuit supplies DC voltage to said discharge circuit via said cable at a current of 100 milliamps or less.

30. The exciter system of claim 27, wherein said charging and discharge circuits are remotely located from each other on an aircraft having a fuselage, wings, and at least one engine, with said charging circuit being located within the aircraft fuselage, said discharge circuit being located at the engine, and said cable extending from the aircraft fuselage into one of the aircraft wings.

31. The exciter system of claim 27, further comprising one or more protective devices shielding said charging circuit together with other electrical circuitry.

32. The exciter system of claim 27, further comprising a connector disposed in an opening in said housing, wherein said connector is directly attached to said igniter.

33. The exciter system of claim 27, wherein said energy storage device and said switching device are sealed within said second housing.

34. The exciter system of claim 33, wherein said second housing comprises a metal can having a metal lid covering an open end of said can.

35. The exciter system of claim 34, wherein said energy storage device and said switching device are potted within said can.

36. The exciter system of claim 27, wherein said housing contains a number of electrical components that are a part of said discharge circuit and wherein all of said electrical components are passive devices.

* * * * *